United States Patent
Pan

(10) Patent No.: US 7,315,435 B1
(45) Date of Patent: Jan. 1, 2008

(54) DISK DRIVES, HEAD STACK, HEAD GIMBAL AND SUSPENSION ASSEMBLIES HAVING POSITIONAL CONDUCTIVE FEATURES

(75) Inventor: Tzong-Shii Pan, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 384 days.

(21) Appl. No.: 11/083,641

(22) Filed: Mar. 17, 2005

(51) Int. Cl.
*G11B 5/55* (2006.01)
(52) U.S. Cl. .................................. 360/245.2
(58) Field of Classification Search .............. 360/245.2
See application file for complete search history.

(56) References Cited

U.S. PATENT DOCUMENTS 6,522,503 B2 * 2/2003 Takadera et al. ......... 360/245.2
7,194,795 B2 * 3/2007 Jenneke ................... 29/603.03

* cited by examiner

*Primary Examiner*—A. J. Heinz
(74) *Attorney, Agent, or Firm*—Young Law Firm

(57) ABSTRACT

A disk drive includes a disk, and a head stack assembly (HSA). The HSA includes a preamplifier; an actuator assembly that defines an actuator arm; a load beam supported by the actuator arm, the load beam defining a registration feature. A flexure is coupled to the load beam, the flexure defining an opening that is centered on the registration feature and including a plurality of conductive formations. The conductive formations include a plurality of conductive flexure connection pads that collectively define a center point; a plurality of conductive traces to electrically couple the plurality of flexure connection pads to the preamplifier, and a conductive feature disposed away from and aligned with the center point, the conductive feature at least partially surrounding the opening within the flexure. A slider is coupled to the plurality of flexure connection pads for reading and writing to the disk.

23 Claims, 3 Drawing Sheets

DISK DRIVES, HEAD STACK, HEAD GIMBAL AND SUSPENSION ASSEMBLIES HAVING POSITIONAL CONDUCTIVE FEATURES

BACKGROUND OF THE INVENTION

1. Field of the Invention

The present invention relates to disk drives. More particularly, the present invention relates to disk drives, head stack, head gimbal and suspension assemblies that include conductive features used for alignment and placement of load beam and/or flexure features.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a flexure (also called a gimbal) attached to an end of the load beam, and a slider attached to the flexure. The load beam has a spring function that provides a "gram load" biasing force and a hinge function that permits the slider to follow the surface contour of the spinning disk. The load beam has an actuator end that connects to the actuator arm and a flexure end that connects to the flexure that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

Early HGAs included a number of twisted wires within a tube attached to a side of the actuator arm to electrically couple the slider to the preamplifier. However, more recent developments in the disk drive industry, such as the continuing miniaturization of slider assemblies (including the head and the transducer) and the transition to magnetoresistive (MR) heads have led to abandoning such configurations in favor of a configuration in which conductive traces are laid on a polyimide film formed on or coupled to the gimbal assembly. Such technologies are variously named TSA (Trace Suspension Assembly), CIS (Circuit Integrated Suspension, FOS (Flex On Suspension) and the like. Whatever their differences, each of these technologies replaces the discrete twisted wires with conductive traces (copper, for example) and insulating (such as polyimide, for example) and support or cover layers (including stainless steel, for example). These conductive traces interconnect the transducer elements of the head to the drive preamplifier and the circuits associated therewith.

To enable the slider to fly over the recording surface of the disk, the load beam, near its distal-most free end, has a dimple formed therein. The spherical outline of the dimple enables the slider to exhibit some measure of pivot movement (e.g., pitch and roll) relative to the flexure. As track densities increase, slider dimensions may correspondingly decrease. As these dimensions decrease, the proper positioning of the dimple formed in the load beam becomes increasingly important. Conventionally, a variety of holes and cutouts in the load beam are used to provide a spatial reference for the formation of this dimple. Alternatively, holes and/or cutouts on the frame on which the suspension assemblies are formed may be used as spatial references or registration features for the proper alignment and positioning of the dimple. These holes and/or cutouts may be used by machine vision systems and/or pins inserted therethrough to align and position the dimple to be formed within the load beam. During the manufacture of the TSA, a masking and etching process is used to form the laminate flexure, which is then welded onto the load beam. The TSA includes a plurality of conductive traces as well as four or more bonding pads to electrically couple the slider to the preamplifier. The slider itself includes at least four bonding pads configured to align with the bonding pads on the TSA. As the size and pitch of the bonding pads is quite small (currently may be about 75 microns and about 113 microns, respectively), it is imperative that the bonding pads on the flexure be precisely located relative to the dimple to insure the flyability of the slider. Positioning of the slider relative to the dimple will affect flyability and the positioning of the flexure bonding pads will affect the yield of the slider to flexure bonding. However, because the dimple is formed relative to features (e.g., cutouts and other registration features) of the load beam and as the bonding pads on the flexure are formed by a separate masking and etching process that uses different spatial references, positioning errors stack up. That is, the tolerances for the formation of the bonding pads and for the formation of the dimple add to one another. As the dimensions of the slider and associated features decrease, these added tolerances become a non-negligible factor relative to the size of the slider and bonding pads and can affect the positioning of the flexure bonding pads and the slider relative to the dimple and by extension, the flyability of the slider over the recording surface of the disk.

An exemplary conventional TSA-type HGA 100 is shown in FIG. 1. FIG. 1 shows the surface of the HGA 100 that faces the recording surface of the disk when the HSA incorporating the HGA 100 is mounted within a disk drive. As shown therein, the conventional HGA includes a load beam 102 that may attach to an actuator arm (not shown in FIG. 1) of an HSA (also not shown in FIG. 1) through, for example, a swaging process through an opening 101 defined within the load beam 102. The TSA includes a flexure 104 that is coupled to the load beam 102. The flexure 104 includes a plurality of conductors that electrically couple a slider to the preamplifier of the HSA. As shown in FIG. 1, the flexure defines flexure bonding pads 113 to which corresponding bonding pads of the slider (not shown) electrically connect. The load beam 102 of conventional HGA 100 of FIG. 1 includes a plurality of load beam features, at reference numerals 108, 112 and 116. These features are shown in FIG. 1 as being cutouts defined within the load beam 102. The flexure 104 may also include one or more flexure registration features. For example, the flexure 104 may define a flexure registration feature 106 that is formed so as to align with the underlying load beam feature 108 and a flexure registration feature that is formed so as to align with the underlying load beam feature 112. The dimple 114 is also shown in FIG. 1, formed within the load beam 102, at the distal free end thereof. Conventionally, the dimple 114 is not formed at the same time (or using the same process) as the load beam features 108, 112 or the flexure registration feature(s). Indeed, while the load beam 102 is etched to form the load beam features 108, 112 and 114, a forming process is employed to form the dimple 114, by means of a local deformation of the load beam to form the spherical dimple 114. As the bonding pads 113, the flexure registration features 106, 110 and the dimple 114 do not use the same positional references, positioning errors stack up (add), which has the potential to cause the misalignment of the flexure bonding pads 113 relative to the dimple 114 and the misalignment of the flexure bonding pads 113 relative to the corresponding pads on the slider. It is to be noted that, when bonding the slider to the flexure 104, the flexure bonding pads 114 are not used as positional references.

From the foregoing, it may be appreciated that improved disk HSAs, HGAs, suspensions and disk drives are needed in which the dimple is precisely positioned relative to the flexure bonding pads and in which the above-detailed cumulative positional errors are eliminated or minimized.

SUMMARY OF THE INVENTION

According to an embodiment thereof, the present invention is a disk drive that includes a disk, and a head stack assembly. The head stack assembly includes a preamplifier; an actuator assembly that defines an actuator arm; a load beam supported by the actuator arm, the load beam defining a registration feature and a flexure coupled to the load beam, the flexure defining an opening that is centered on the registration feature and including a plurality of conductive formations. The conductive formations may include a plurality of conductive flexure connection pads that collectively define a center point; a plurality of conductive traces to electrically couple the plurality of flexure connection pads to the preamplifier, and a conductive feature disposed away from and aligned with the center point, the conductive feature at least partially surrounding the opening within the flexure. A slider may be coupled to the plurality of flexure connection pads for reading and writing to the disk.

According to further embodiments, a dimple may be formed in the load beam, the dimple being aligned with the registration feature, which is aligned with the conductive feature. The center point may be defined such that an equal number of flexure connection pads are disposed on either side thereof. The slider may include a plurality of slider connection pads configured to electrically couple to corresponding ones of the plurality of conductive flexure connection pads. The registration feature may include a through hole. The plurality of conductive formations may be formed from a same masking and etching process.

According to another embodiment thereof, the present invention is a head stack assembly including an actuator assembly that defines an actuator arm; a load beam supported by the actuator arm, the load beam defining a registration feature and a flexure coupled to the load beam. The flexure may define an opening that is centered on the registration feature and may include a plurality of conductive formations. These conductive formations may include a plurality of conductive flexure connection pads that collectively define a center point; a plurality of conductive traces to configured to electrically couple the plurality of flexure connection pads to a preamplifier, and a conductive feature disposed away from and aligned with the center point, the conductive feature at least partially surrounding the opening within the flexure. A slider may be coupled to the plurality of flexure connection pads for reading and writing to the disk.

A dimple may be formed in the load beam, the dimple being aligned with the registration feature, which is aligned with the conductive feature. The center point may be defined such that an equal number of flexure connection pads are disposed on either side thereof. The slider may include a plurality of slider connection pads configured to electrically couple to corresponding ones of the plurality of conductive flexure connection pads. The registration feature may include a through hole, for example. The plurality of conductive formations may advantageously be formed from the same masking and etching process.

According to still another embodiment thereof, the present invention is a head gimbal assembly for attachment to an actuator arm in a disk drive. The head gimbal assembly may include a load beam configured to be supported by the actuator arm, the load beam defining a registration feature and a flexure coupled to the load beam, the flexure defining an opening that is centered on the registration feature and including a plurality of conductive formations. The conductive formations may include a plurality of conductive flexure connection pads that collectively define a center point; a plurality of conductive traces to configured to electrically couple the plurality of flexure connection pads to a preamplifier, and a conductive feature disposed away from and aligned with the center point, the conductive feature at least partially surrounding the opening within the flexure. A slider may be coupled to the plurality of flexure connection pads for reading and writing to the disk.

A dimple may be formed in the load beam, the dimple being aligned with the registration feature, which is aligned with the conductive feature. The center point may be defined such that an equal number of flexure connection pads are disposed on either side thereof. The slider may include a plurality of slider connection pads configured to electrically couple to corresponding ones of the plurality of conductive flexure connection pads. The registration feature may include a through hole. The plurality of conductive formations may be formed from a same masking and etching process.

The present invention, according to another embodiment thereof, may also be viewed as a suspension assembly for attachment to an actuator arm in a disk drive and for supporting a slider. Such a suspension assembly may include a load beam configured to be supported by the actuator arm, the load beam defining a registration feature and a flexure coupled to the load beam, the flexure defining an opening that is centered on the registration feature and including a plurality of conductive formations. The conductive formations may include a plurality of conductive flexure connection pads that collectively define a center point; a plurality of conductive traces to configured to electrically couple the plurality of flexure connection pads to a preamplifier, and a conductive feature disposed away from and aligned with the center point, the conductive feature at least partially surrounding the opening within the flexure.

A dimple may be formed in the load beam, the dimple being aligned with the registration feature, which is aligned with the conductive feature. The center point may be defined such that an equal number of flexure connection pads are disposed on either side thereof. The registration feature may include a through hole. The plurality of conductive formations may be formed from the same masking and etching process.

According to a further embodiment, the present invention is a suspension assembly for attachment to an actuator arm in a disk drive and for supporting a slider. The suspension assembly includes a load beam configured to be supported by the actuator arm, the load beam defining a registration feature and a flexure coupled to the load beam, the flexure defining an opening that is centered on the registration feature and including a plurality of conductive formations. The conductive formations may include a plurality of conductive flexure connection pads that collectively define a center point; a plurality of conductive traces to configured to electrically couple the plurality of flexure connection pads to a preamplifier, and a pair of conductive features disposed away from and on either side of the center point, the pair of conductive features defining an angle relative to the opening within the flexure.

The pair of conductive features may be aligned with the opening within the flexure such that the angle is substantially 180 degrees, for example. The pair of conductive features may define an angle relative to the opening within the flexure that is less than 180 degrees, for example.

DESCRIPTION OF THE PREFERRED EMBODIMENTS

Figure 2A:
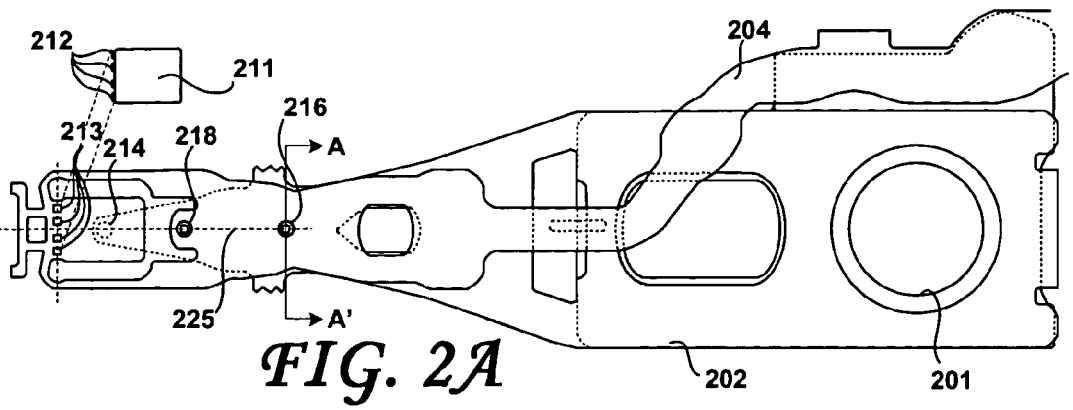
FIG. 2A shows a plan representation of a gimbal assembly, according to an embodiment of the present invention.
Figure 2B:
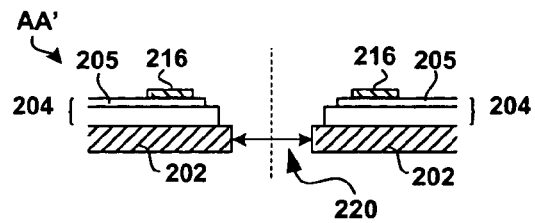
FIG. 2B is a cross-sectional view of a conductive feature according to an embodiment of the present invention, taken along cross-sectional line AA' in FIG. 2A.
Figure 2C:
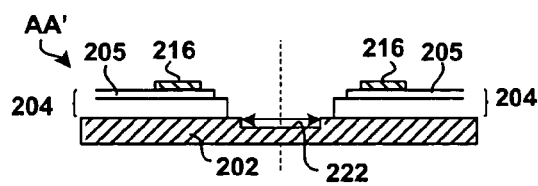
FIG. 2C is a cross-sectional view of a conductive feature according to another embodiment of the present invention, taken along cross-sectional line AA' in FIG. 2A.
Figure 3:
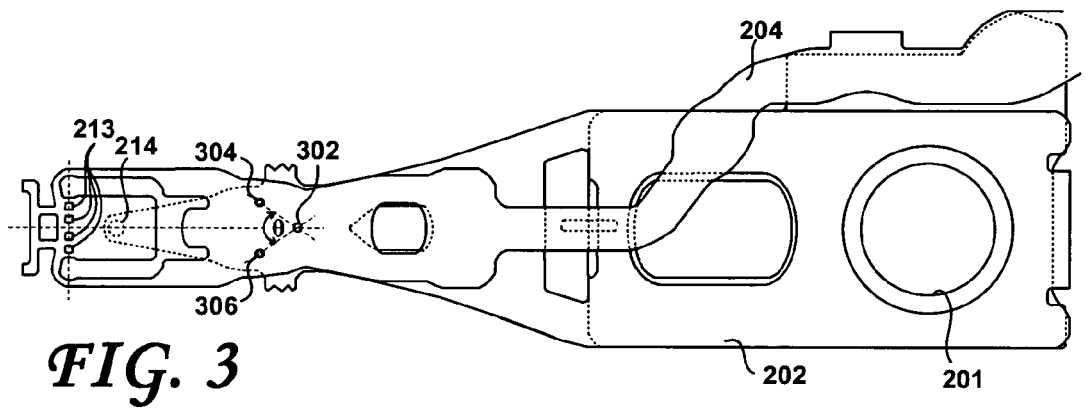
FIG. 3 shows a plan representation of a gimbal assembly, according to another embodiment of the present invention.
Figure 4:
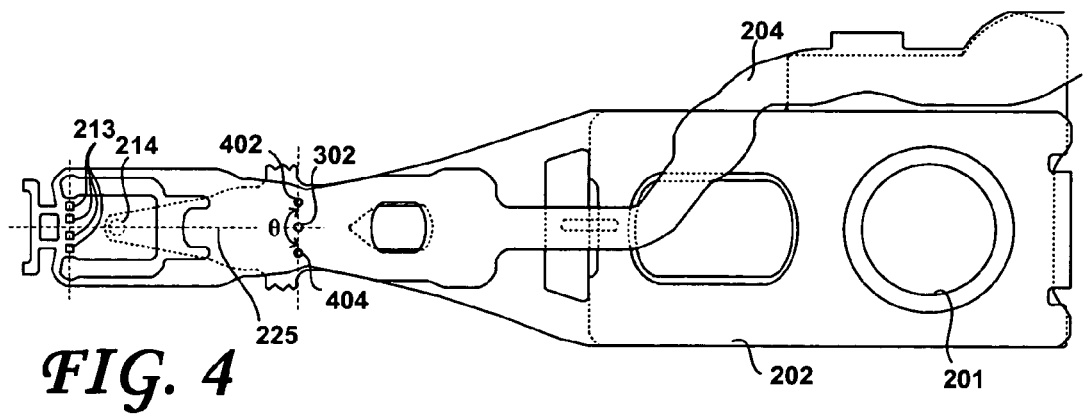
FIG. 4 shows a plan representation of a gimbal assembly, according to still another embodiment of the present invention.

FIG. 2A shows a head gimbal assembly, according to an embodiment of the present invention. FIG. 2B is a cross-sectional view of a conductive feature according to an embodiment of the present invention, taken along cross-sectional line AA' in FIG. 2A. FIG. 2C is a cross-sectional view of a conductive feature according to another embodiment of the present invention, taken along cross-sectional line AA' in FIG. 2A. FIGS. 3 and 4 show further embodiments of the present invention. Considering now FIGS. 2A, 2B, 2C, 3 and 4 collectively, the HGA includes a load beam 202 that may attach to an actuator arm (shown in FIG. 5) of an HSA (also shown in FIG. 5) through, for example, a swaging process through an opening 201 defined within the load beam 202. The TSA includes a flexure 204 that is coupled to the load beam 202. The dimple 214, shown in FIGS. 2A, 3 and 4, is formed within the load beam 202, at the distal free end thereof.

The load beam 202 may include one or more load beam registration features, best seen in the cross-sectional views of FIGS. 2B and 2C. Such load beam registration features may include, for example, a through hole formed within the load beam 202 as shown at 220 in FIG. 2B or a cavity within the load beam 202, as shown at 222 in FIG. 2C. The cavity 222 may be formed by, for example, an etching process. The load beam registration feature or features may be configured differently, as long as it or they are effective to serve as a positional reference, as described below. As also shown in FIGS. 2B and 2C, the flexure 204 may also define one or more corresponding openings that may be aligned with and centered on the load beam registration features 220 or 222.

As shown in FIGS. 2A, 3 and 4, the flexures 204 of the head gimbal assemblies define a plurality of conductive formations. Such conductive formations include a plurality of conductive traces that electrically couple a slider 211 to the preamplifier of the HSA, as well as a plurality of flexure connection pads 213 to which corresponding bonding pads 212 of the slider 211 electrically connect. The embodiments illustrated in FIGS. 2A, 3 and 4 have four such flexure connection pads, although the present inventions are not to be limited thereto. Indeed, the present inventions are extendable to embodiments in which the slider has 5, 6 or more bonding pads and the flexure 204 defines a corresponding number of flexure bonding pads to accommodate the electrical requirements of different transducer technologies. In any event, the plurality of flexure connection pads 213 defines a center point. This longitudinal axis 225 of the load beam 202 may be defined so as pass through this center point. In the case wherein the flexure 204 defines four such flexure bonding pads 213, the center point may be defined such that an equal number of flexure connection pads 213 are disposed on either side of the center point. According to an embodiment of the present invention, the conductive formations of the flexure 204, in addition to the conductive traces and the flexure connection pads 213, also include one or more conductive features, shown at reference numerals 216, 218 in FIG. 2A, reference numerals 302, 304 in FIG. 3 and reference numerals 402 and 404 in FIG. 4. As shown, these conductive features may be formed on the flexure 204. For example, the conductive features may be formed on an insulating layer of the flexure 204, such as insulating layer 205 shown in the cross-sectional views of FIGS. 2B and 2C. For example, the insulating layer 205 may be formed of or include polyimide.

Figure 1:
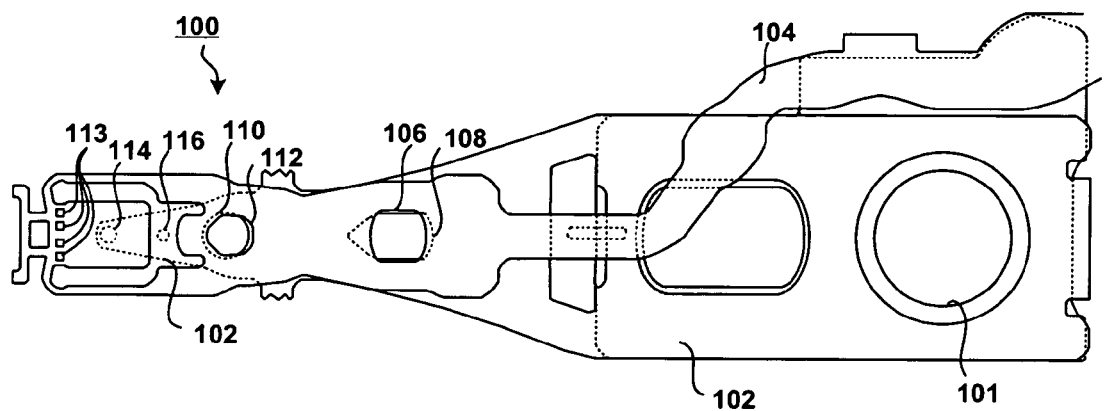
FIG. 1 shows a conventional gimbal assembly.

As shown in FIG. 2A, the conductive features 216, 218 are disposed away from and are aligned with the center point defined by the flexure connection pads 213. Also, the conductive features may be configured such that they fully or partially surround the opening within the flexure 204, as best seen in FIGS. 2B and 2C. Advantageously, the plurality of conductive formations (at least the conductive flexure connection pads 213, the conductive traces coupling the pads 213 to the preamplifier and the conductive features 216, 218, 302, 304) is formed from the same masking and etching process. As shown in FIG. 2A, the dimple 214 may be formed near the distal free end of the load beam 202, using the conductive features as positional reference(s), using machine vision and/or mechanical means. This allows the dimple 214 to be precisely located relative to the center point defined by the flexure connection pads 213, and not relative to some other positional reference(s) on the load beam 204 and/or on the frame on which the suspension assemblies are formed. Because the conductive features are formed at the same time and by the same processes that formed the flexure connection pads 213 and because the conductive features are formed, according to one embodiment so as to be centered on and aligned with the opening(s) in the flexure and on the underlining registration feature(s) formed within the load beam 202, the dimple 214 may be placed with greater precision with reference to these conductive features than is otherwise possible without such positional references. Moreover, as these conductive features are very precisely disposed relative to the center point, the placement of the dimple 214 does not suffer from the cumulative nature of the positional errors that have plagued conventional head gimbal assemblies, such as described relative to FIG. 1. According to an embodiment of the present invention, these conductive formations may be formed of or may include copper, for example. FIG. 2A shows two such conductive features, at reference numerals 216 and 218. However, a greater or lesser number of such conductive features may be formed, as those of skill in this art may appreciate.

The conductive feature(s) need not be centered on and aligned with the underlining registration feature(s) on the load beam. FIG. 3 is a plan view of a gimbal assembly, according to another embodiment of the present invention. As shown therein, a pair of conductive features 304, 306 is disposed away from and on either side of the center point defined by the conductive flexure connection pads 213. As shown in FIG. 3, the conductive features 304, 306 may define an angle θ relative to the opening within the flexure. This angle θ may be less than 180 degrees, for example. These conductive features 304, 305 may then be used by a machine vision system, for example, to precisely locate the opening in the flexure 204 that is aligned with the underlining registration feature in the load beam 202. For example, if the angle θ formed by the two conductive features 304, 306 and the opening in the flexure 204 is know, the location of the opening in the flexure 204 may be precisely located, with consequent alignment thereof with the center point defined by the conductive flexure connection pads 213. Alternatively, as shown in FIG. 4, the angle θ may be 180 degrees, for example. If the angle θ is chosen to be 180 degrees, the conductive features 402, 404 and the opening in the flexure 204 define a straight line that is perpendicular to the longitudinal axis 225 of the load beam 202. Other variations in the placement of the conductive features are possible and are deemed to fall within the scope of the present invention.

Figure 5:
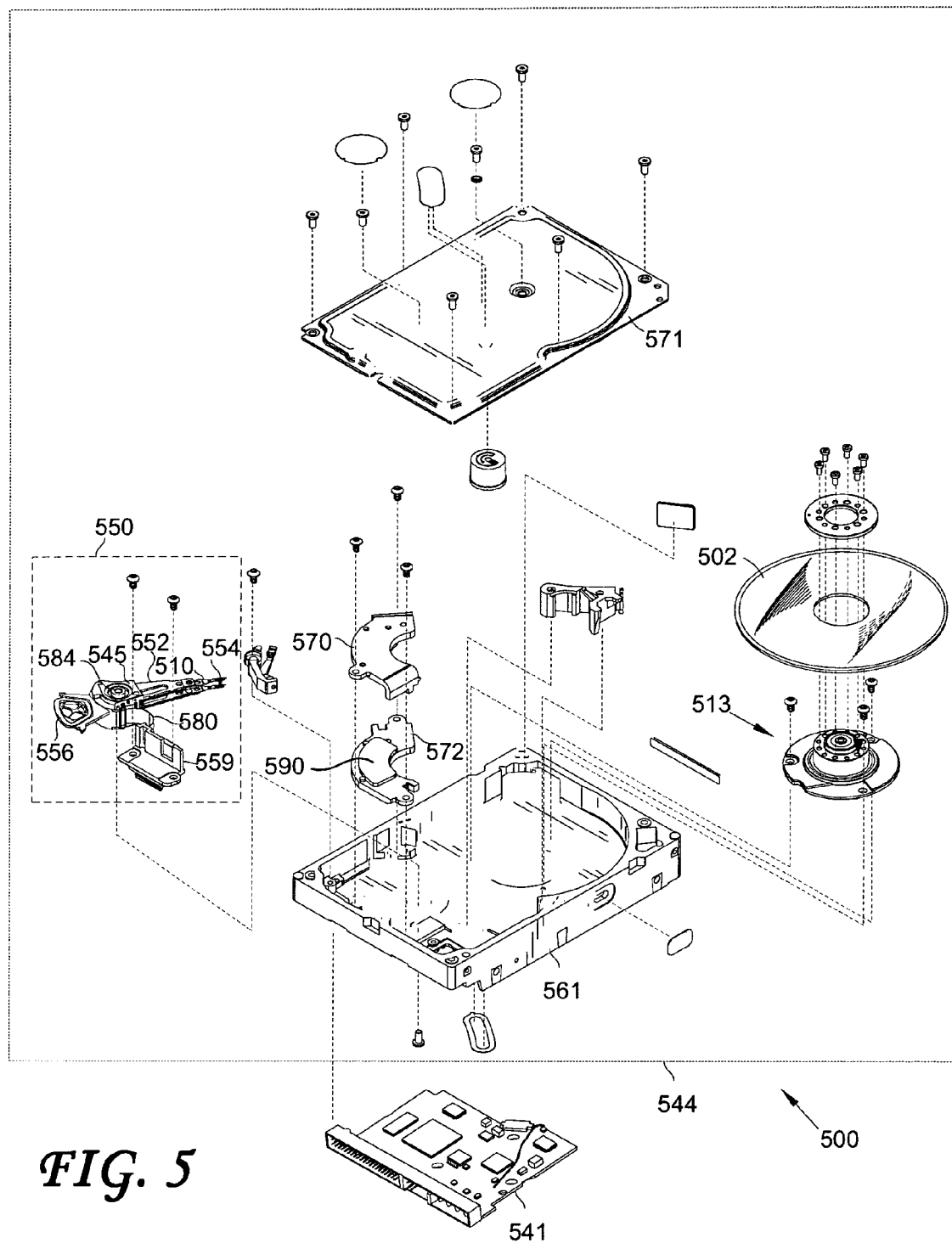
FIG. 5 is an exploded view of a head stack assembly and a disk drive constructed in accordance with an embodiment of the present invention.

FIG. 5 shows the principal components of an exemplary magnetic disk drive 500 constructed in accordance with the present invention. With reference to FIG. 5, the disk drive 500 comprises a HDA 544 and a PCBA 541. The HDA 544 includes a base 561 and a cover 571 attached to the base 561 that collectively house a disk 502 (or a stack of two or more such disks 502), a spindle motor 513 attached to the base 561 for rotating the disk 502, an HSA 550, and a pivot bearing cartridge 584 (such as a stainless steel pivot bearing cartridge, for example) that rotatably supports the HSA 550 on the base 561. The spindle motor 513 rotates the disk 502 at a constant angular velocity. The HSA 550 comprises a swing-type or rotary actuator assembly 552, at least one HGA 510 constructed as described above, and a flex circuit cable assembly 580. The rotary actuator assembly 552 includes a body portion, at least one actuator arm cantilevered from the body portion, and a coil portion 556 cantilevered from the body portion in an opposite direction from the actuator arm. The actuator arm supports the HGA 510 that, in turn, includes and supports the slider(s) 212 (see FIG. 2A). The flex cable assembly 580 may include a flex circuit cable and a flex clamp 559. The HSA 550 is pivotally secured to the base 561 via the pivot-bearing cartridge 584 so that the slider at the distal end of the HGA 510 may be moved over the surfaces of the disk(s) 502. The pivot-bearing cartridge 584 enables the HSA 550 to pivot about a pivot axis. The storage capacity of the HDA 544 may be increased by, for example, increasing the track density (the TPI) on the disk 502 and/or by including additional disks 502 in a disk stack and by an HSA 550 having a vertical stack of HGAs 510 supported by a rotary actuator assembly 552 having multiple actuator arms. The "rotary" or "swing-type" actuator assembly 552 rotates on the pivot bearing 584 cartridge about its pivot axis between limited positions and further includes a coil portion 556 that extends from one side of the body portion to interact with one or more permanent magnets 590 mounted to back irons 570, 572 to form a voice coil motor (VCM). The VCM causes the HSA 550 to pivot about the actuator pivot axis to cause the slider and the read-write transducers thereof to sweep radially over the disk(s) 502. The HGA 510 includes a load beam and a suspension coupled to the load beam 202, as detailed above.

What is claimed is:

1. A disk drive comprising:
    a disk, and
    a head stack assembly, the head stack assembly including:
        a preamplifier;
        an actuator assembly that defines an actuator arm;
        a load beam supported by the actuator arm, the load beam defining a registration feature;
        a flexure coupled to the load beam, the flexure defining an opening that is centered on the registration feature and including a plurality of conductive formations, the conductive formations including:
            a plurality of conductive flexure connection pads that collectively define a center point;
            a plurality of conductive traces to electrically couple the plurality of flexure connection pads to the preamplifier, and
            a conductive feature disposed away from and aligned with the center point, the conductive feature at least partially surrounding the opening within the flexure, and
        a slider coupled to the plurality of flexure connection pads for reading and writing to the disk.

2. The disk drive of claim 1, further including a dimple formed in the load beam, the dimple with the being aligned registration feature, which registration feature is aligned with the with the conductive feature.

3. The disk drive of claim 1, wherein the center point is defined such that an equal number of flexure connection pads are disposed on either side thereof.

4. The disk drive of claim 1, wherein the slider includes a plurality of slider connection pads configured to electrically couple to corresponding ones of the plurality of conductive flexure connection pads.

5. The disk drive of claim 1, wherein the registration feature defines a through hole.

6. The disk drive of claim 1, wherein the plurality of conductive formations are formed from a same masking and etching process.

7. A head stack assembly, comprising:
    an actuator assembly that defines an actuator arm;
    a load beam supported by the actuator arm, the load beam defining a registration feature;
    a flexure coupled to the load beam, the flexure defining an opening that is centered on the registration feature and including a plurality of conductive formations, the conductive formations including:
        a plurality of conductive flexure connection pads that collectively define a center point;
        a plurality of conductive traces configured to electrically couple the plurality of flexure connection pads to a preamplifier, and
        a conductive feature disposed away from and aligned with the center point, the conductive feature at least partially surrounding the opening within the flexure, and
    a slider coupled to the plurality of flexure connection pads for reading and writing to the disk.

8. The head stack assembly of claim 7, further including a dimple formed in the load beam, the dimple being aligned with the registration feature, which registration feature is aligned with the conductive feature.

9. The head stack assembly of claim 7, wherein the center point is defined such that an equal number of flexure connection pads are disposed on either side thereof.

10. The head stack assembly of claim 7, wherein the slider includes a plurality of slider connection pads configured to electrically couple to corresponding ones of the plurality of conductive flexure connection pads.

11. The disk head stack assembly of claim 7, wherein the registration feature defines a through hole.

12. The head stack assembly of claim 7, wherein the plurality of conductive formations is formed from a same masking and etching process.

13. A head gimbal assembly for attachment to an actuator arm in a disk drive, the head gimbal assembly:
   a load beam configured to be supported by the actuator arm, the load beam defining a registration feature;
   a flexure coupled to the load beam, the flexure defining an opening that is centered on the registration feature and including a plurality of conductive formations, the conductive formations including:
      a plurality of conductive flexure connection pads that collectively define a center point;
      a plurality of conductive traces configured to electrically couple the plurality of flexure connection pads to a preamplifier, and
      a conductive feature disposed away from and aligned with the center point, the conductive feature at least partially surrounding the opening within the flexure, and
   a slider coupled to the plurality of flexure connection pads for reading and writing to the disk.

14. The head gimbal assembly of claim 13, further including a dimple formed in the load beam, the dimple being aligned with the registration feature, which registration feature is aligned with the conductive feature.

15. The head gimbal assembly of claim 13, wherein the center point is defined such that an equal number of flexure connection pads are disposed on either side thereof.

16. The head gimbal assembly of claim 13, wherein the slider includes a plurality of slider connection pads configured to electrically couple to corresponding ones of the plurality of conductive flexure connection pads.

17. The head gimbal assembly of claim 13, wherein the registration feature defines a through hole.

18. The head gimbal assembly of claim 13, wherein the plurality of conductive formations is formed from a same masking and etching process.

19. A suspension assembly for attachment to an actuator arm in a disk drive and for supporting a slider, the suspension assembly comprising:
   a load beam configured to be supported by the actuator arm, the load beam defining a registration feature;
   a flexure coupled to the load beam, the flexure defining an opening that is centered on the registration feature and including a plurality of conductive formations, the conductive formations including:
      a plurality of conductive flexure connection pads that collectively define a center point;
      a plurality of conductive traces configured to electrically couple the plurality of flexure connection pads to a preamplifier, and
      a conductive feature disposed away from and aligned with the center point, the conductive feature at least partially surrounding the opening within the flexure.

20. The suspension assembly of claim 19, further including a dimple formed in the load beam, the dimple being aligned with the registration feature, which registration feature is aligned with the conductive feature.

21. The suspension assembly of claim 19, wherein the center point is defined such that an equal number of flexure connection pads are disposed on either side thereof.

22. The suspension assembly of claim 19, wherein the registration feature defines a through hole.

23. The suspension assembly of claim 19, wherein the plurality of conductive formations are formed from a same masking and etching process.

* * * * *